(12) United States Patent
Flowers

(10) Patent No.: US 6,582,156 B1
(45) Date of Patent: Jun. 24, 2003

(54) LEVEL CONTROL DEVICE FOR WETLANDS WASTEWATER TREATMENT FACILITIES

(76) Inventor: David A. Flowers, N95 W5872 Essex Ct., P.O. Box 65, Cedarburg, WI (US) 53012-0065

(*) Notice: Subject to any disclaimer, the term of this patent is extended or adjusted under 35 U.S.C. 154(b) by 0 days.

(21) Appl. No.: 09/893,797

(22) Filed: Jun. 28, 2001

(51) Int. Cl.[7] .............................. E02B 11/00; E02B 7/00
(52) U.S. Cl. ....................... 405/41; 405/87; 210/170; 137/236.1
(58) Field of Search ..................... 405/36, 37, 39–41, 405/87, 104; 210/602, 170; 137/236.1

(56) References Cited

U.S. PATENT DOCUMENTS

| | | | |
|---|---|---|---|
| 3,803,851 A | * 4/1974 | Soileau | 405/40 |
| 5,174,897 A | 12/1992 | Wengrzynek | 210/602 |
| 5,893,975 A | 4/1999 | Eifert | 210/602 |
| 5,951,866 A | 9/1999 | Grove et al. | 210/602 |
| 5,993,649 A | 11/1999 | DeBusk et al. | 210/97 |
| 6,126,827 A | 10/2000 | Johnson, Jr. et al. | 210/602 |
| 6,132,139 A | * 10/2000 | Hashimoto et al. | 405/104 |
| 6,159,371 A | 12/2000 | Dufay | 210/602 |
| 6,200,469 B1 | 3/2001 | Wallace | 210/150 |

OTHER PUBLICATIONS

Pipeline, National Small Flows Clearinghouse, Summer 1998, vol. 9, No. 3.
Steiner, Gerald R. et al., *General Design, Construction, and Operation Guidelines*, Mar. 1991.
Steiner, Gerald R., et al., *General Design, Construction and Operation Guidelines, Design Manual #65*, May 1993.
McCarthy, Barbara, et al., *Development of Alternative On–Site Treatment Systems for Wasterwater Treatment: A Demonstration Project for Northern Minnesota*, Dec. 31, 1997, p. ii–14 and 29–30.
Kadlec, Robert H., et al., *Treatment Wetlands*, pp. 49–61 and 652–653, 1996.
United States Environmental Protection Agency, *Constructed Wetlands Treatment and Municipal Wastewaters Manual*, Sep. 2000.

* cited by examiner

Primary Examiner—Thomas B. Will
Assistant Examiner—Tara L. Mayo
(74) Attorney, Agent, or Firm—Whyte Hirschboeck Dudek SC

(57) ABSTRACT

A level control device for constructed wetlands which is suitable for use in cold climates. The device comprises an outer casing with an inner diameter at least about 4 inches and less than about 18 inches with an overflow weir, in fluid communication with the constructed wetland, located inside the outer casing.

12 Claims, 2 Drawing Sheets

LEVEL CONTROL DEVICE FOR WETLANDS WASTEWATER TREATMENT FACILITIES

FIELD OF THE INVENTION

This invention relates to constructed wetlands that are used to treat wastewater, more particularly, for the control of the water level of such wetlands.

BACKGROUND OF THE INVENTION

Constructed wetlands are artificial wastewater treatment systems consisting of shallow (usually less than 1 m deep) ponds or channels which have been planted with aquatic plants, and which rely upon natural microbial, biological, physical and chemical processes to treat wastewater. They typically have impervious clay or synthetic liners, and engineered structures to control the flow direction, liquid detention time and water level. Depending on the type of system, they may or may not contain an inert porous media such as rock, gravel or sand.

Constructed wetlands have been used to treat a variety of sources of wastewater including urban runoff, municipal, industrial, agricultural and acid mine drainage. While some degree of pre- or post-treatment may be required in conjunction with the wetland to treat wastewater to meet stream discharge or reuse requirements, the wetland will be the central treatment component.

For some applications, wetlands are an excellent option because they are low in cost and in maintenance requirements, offer good performance, and provide a natural appearance, if not more beneficial ecological benefits. However, because they require large land areas, 4 to 25 acres per million gallons of flow per day, wetlands are not appropriate for some applications. Constructed wetlands are especially well suited for wastewater treatment in small communities where inexpensive land is available and skilled operators are hard to find.

Constructed wetlands have been classified by the literature and practitioners into two types. Free water surface (FWS) wetlands (also known as surface flow wetlands) closely resemble natural wetlands in appearance because they contain aquatic plants that are rooted in a soil layer on the bottom of the wetland and water flows through the leaves and stems of plants. Vegetated submerged bed (VSB) systems (also known as subsurface flow wetlands) do not resemble natural wetlands because they have no standing water. They contain a bed of media (such as crushed rock, small stones, gravel, sand or soil) which has been planted with aquatic plants. When properly designed and operated, wastewater stays beneath the surface of the media, flows in contact with the roots and rhizomes of the plants, and is not visible or available to wildlife.

The term "vegetated submerged bed" is used herein instead of subsurface flow wetland because it is a more accurate and descriptive term. Some VSBs may meet the strict definition of a wetland, but a VSB does not support aquatic wildlife because the water level stays below the surface of the media, and is not conducive to many of the biological and chemical interactions that occur in the water and sediments of a wetland with an open water column. VSBs have historically been characterized as constructed wetlands in the literature, and so they are included in this application.

Constructed wetlands were first developed in the relatively warm climate of Tennessee. As use of these constructed wetlands spread northwards, concerns arose over the possibility of the wetlands freezing thereby disabling the water treatment system. The largest concern is that the level control system will freeze thereby flooding the wetland. Solutions that have been tried to maintain the function of a wetland during cold temperatures include massive amounts of insulation and/or provision of heating elements to maintain the temperature of the level control device. Grove et al. (U.S. Pat. No. 5,951,866) discloses a cold climate wetland wastewater treatment system in which the hydraulic level control structure is positioned entirely within the rear end of the containment area. These solutions add to the expense of the wetlands wastewater treatment system and the inconvenience of servicing the wetlands.

Therefore, it would be desirable to have a wetlands level control device that solves the aforementioned problems.

SUMMARY OF THE INVENTION

The present invention provides an improved level control device for wetland wastewater treatment facilities that overcomes the aforementioned problems. The device comprising: an outer casing with an open top, the outer casing having an inner diameter at least about 4 inches and less than about 18 inches; an overflow weir in fluid communication with the constructed wetlands, wherein the overflow weir is located within the outer casing; a cap removably attached in a closing position over the open top of the outer casing; and an outlet in fluid communication with the overflow weir wherein the outlet provides a fluid flow path through the outer casing.

An improved device for controlling the level of a constructed wetlands wastewater treatment system, the device comprising: an outer casing with an open top, the outer casing having an outer surface and an inner surface and an inner diameter at least about 4 inches and less than about 18 inches; an overflow weir comprising an overflow pipe in fluid communication with the constructed wetlands, wherein the overflow pipe is located within the outer casing and has an outer diameter at least about 2 inches less than the inner diameter of the outer casing; a cap removably attached in a closing position over the open top of the outer casing; and an outlet in fluid communication with the overflow weir wherein the outlet extends through the outer casing from the inner surface to the outer surface providing a fluid flow path through the outer casing.

Various other features, objects and advantages of the present invention will be made apparent from the following detailed description and the drawings.

BRIEF DESCRIPTION OF THE DRAWINGS

Preferred embodiments of the invention are described below with reference to the following accompanying drawings, which are for illustrative purposes only. Throughout the following views, reference numerals will be used in the drawings, and the same reference numerals will be used throughout the several views and in the description to indicate same or like parts.

In the drawings.

DETAILED DESCRIPTION OF THE PREFERRED EMBODIMENT

In the following detailed description, references made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention.

Figure 1:
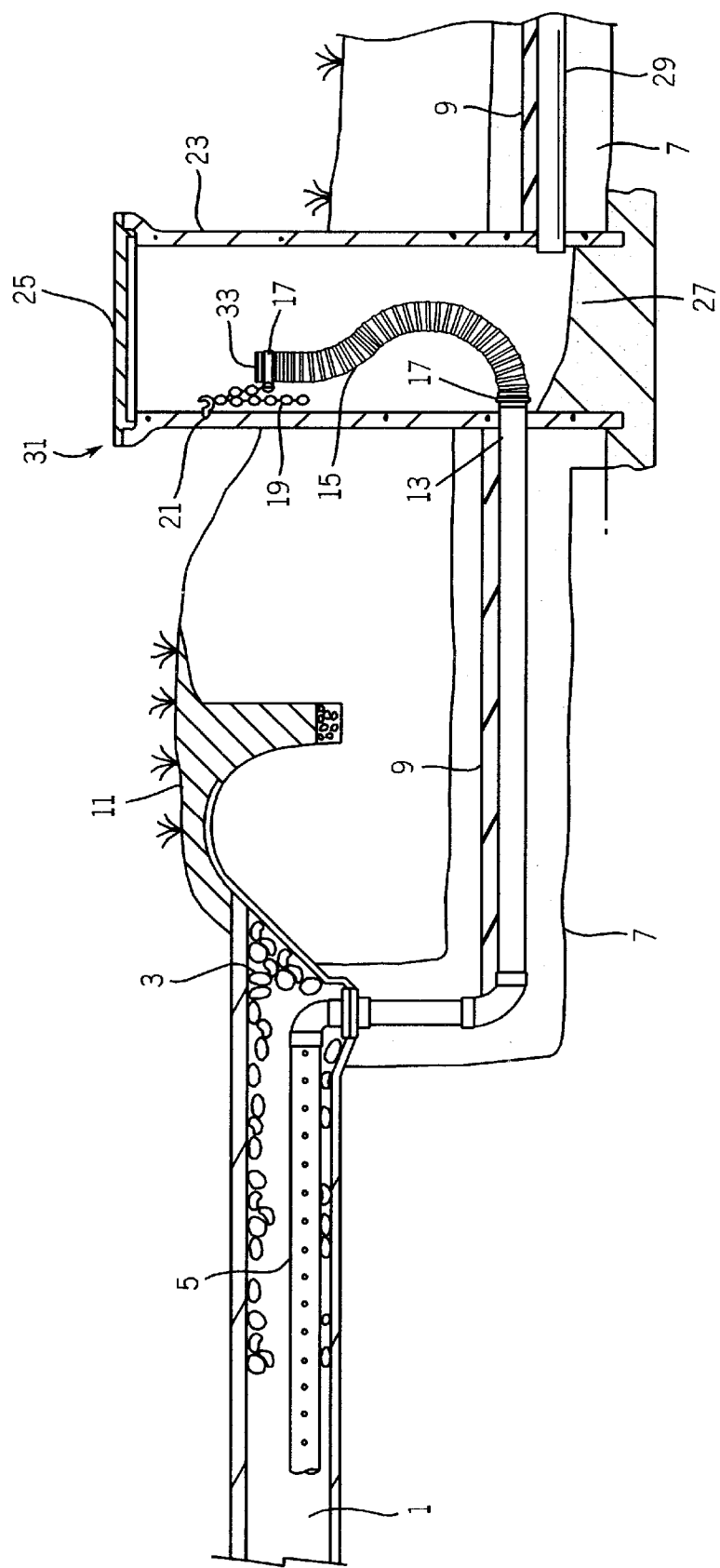
FIG. 1 shows a section view of a prior art flow control device for wetlands wastewater treatment.

FIG. 1 shows a wetlands with a typical prior art water level control device. Water floods wetlands 1 and is discharged via wetlands drainage pipe 5 which is often embedded in cobbles 3. Wetlands drainage pipe 5 passes under a berm 11. Drainage pipe 5 is supported by pea gravel 7 and protected from the cold by rigid insulation 9 and the earth in berm 11. The level of water in wetlands 1 is controlled by level control device 31. Level control device 31 consists of a manhole casing 23 which is puddled into a concrete slab 27 and closed with a manhole cover 25. In a typical prior art application, manhole casing 23 is at least two feet in diameter, frequently three to four feet in diameter. Manhole casing 23 is frequently four to six feet tall. Drainage pipe 5 enters level control device 31 and is connected to flexible hose 15 via rubber boot 13. Typically, band clamps 17 fasten rubber boot 13 to drainage pipe 5 and flexible hose 15 to rubber boot 13. Another stainless steel clamp 17 connects flexible hose 15 to chain 19. Chain 19 is attached to hook 21 thereby holding the discharge end 33 of flexible hose 15 in the desired position. The height of the discharge end 33 may be adjusted by changing which link of chain 19 is attached to hook 21. Water from the wetlands 1 flows through discharge pipe 5 and flexible hose 15 and discharges through the discharge end 33. As such, the water level in wetlands 1 is the same as the height of discharge end 33. Water outflowing from discharge end 33 pools on the concrete slab 27 and overflows through outlet pipe 29. Similar to discharge pipe 5, outlet pipe 29 is surrounded by pea gravel 7 and covered by rigid insulation 9.

In typical installations drainage pipe 5, flexible hose 15 and outlet pipe 29 are all at least three inches in diameter. These dimensions are typically regulated by state or local codes.

A number of common variations to level control device 31 are known in the prior art. In one such variation, rubber boot 13 and flexible hose 15 are attached to outlet pipe 29 rather than to wetlands drainage pipe 5. In this variation, water from the wetlands fills manhole casing 23 up to the level of discharge end 33 of flexible hose 15. The water then overflows into discharge end 33 of flexible hose 15 and passes out through outlet pipe 29.

Another common variation of level control device 31, rubber boot 13 is replaced with a rotatable 90° elbow. Flexible hose 15 is replaced with a rigid pipe and clamps 17, chain 19 and hook 21 are eliminated. The water level is controlled by rotating the 90° elbow such that the discharge end of the rigid pipe travels upward or downward along a circular arc.

The prior art has made adaptations to level control device 31 in order to adjust to cold weather conditions. Such adaptations usually consist of heavily insulating manhole casing 23 and burying the casing 23 deep in berm 11. Another such adaptation is to position level control device 31 within the wetlands 1 thereby using the water and vegetation of wetlands 1 for insulation.

Figure 2:
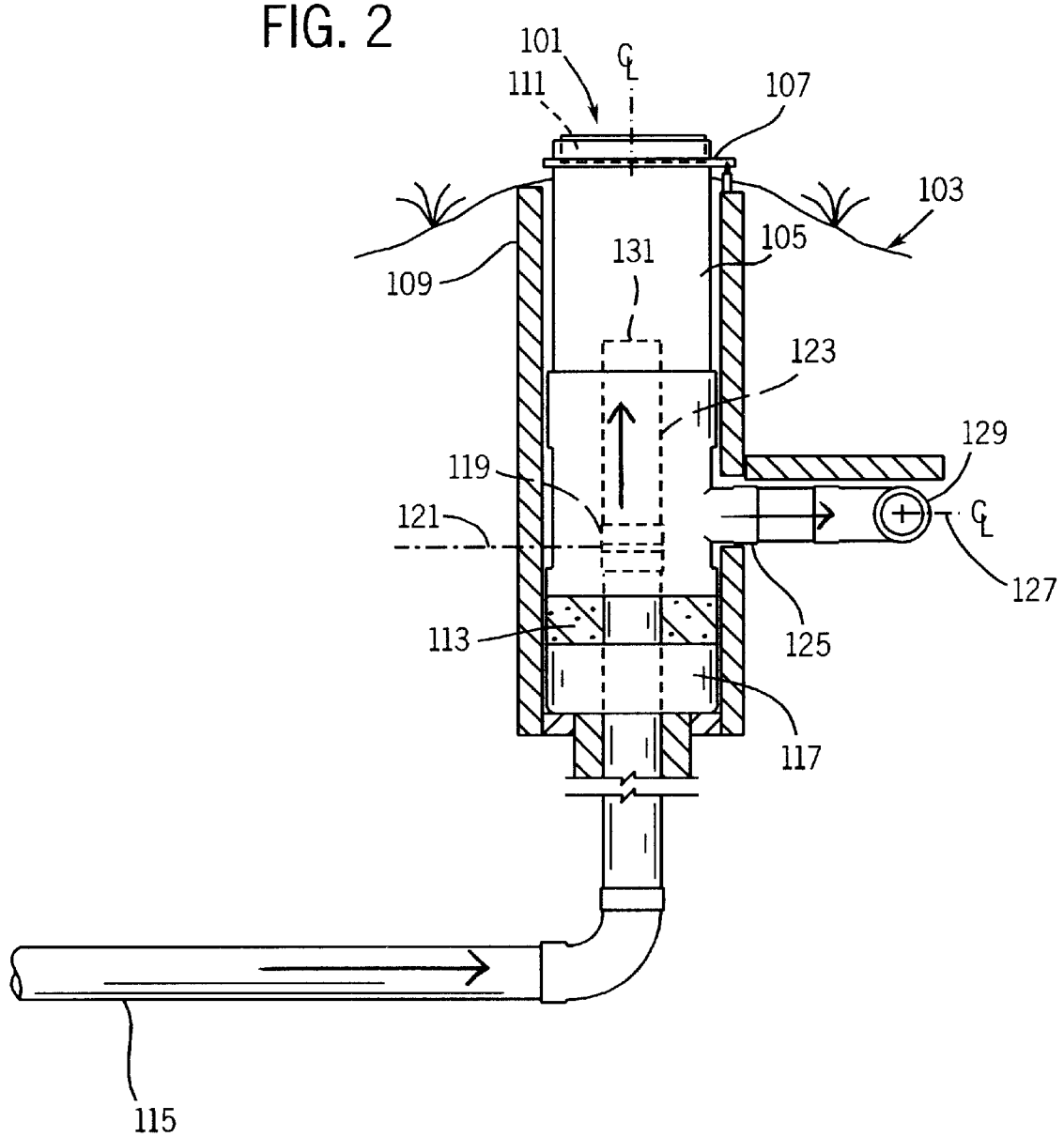
FIG. 2 shows a section view of the level control device of one embodiment of the present invention.

FIG. 2 shows a preferred embodiment of the level control device of the current invention. Level control device 101 is positioned within a berm 103. Level control device 101 consists of a casing 105 and a pipe cap 107. Casing 105 and pipe cap 107 may be made out of any suitable material, preferably PVC (polyvinyl chloride) pipe. Rigid insulation 109 is installed around casing 105 and rigid insulation 111 is installed within pipe cap 107. Preferably, pipe cap 107, when attached in a closing position over the top of the casing 105, forms a windproof seal. Casing 105 has a diameter ranging from about 4–18 inches, typically about 12 inches. Pipe cap 107 has a diameter corresponding to the diameter of casing 105. The bottom of case 105 may be filled with grout 113. Wetlands drainage pipe 115 enters casing 105 through a reducer 117. In a typical application wherein the materials of construction are PVC, the reducer 117 and wetlands drainage pipe 115 are solvent welded at all connection services. Wetlands drainage pipe 115 extends upward through the center of casing 105 to an elevation 121. Typically, wetland drainage pipe 115 is installed with its center line coincident with the center line of casing 105, although this alignment is not critical. Elevation 121 is the same as the elevation of the liner (floor) of the wetland (not shown). Coupling 119 is affixed to overflow pipe 123. Coupling 119 is slidably attached to wetland drainage pipe 115 at elevation 121. The length of overflow pipe 123 defines a weir 131 which in turn defines the level of the wetland. The height of weir 131 may be adjusted by using different length overflow pipe 123. Water discharging from the wetland overflows weir 131 into casing 105 and pools on the floor defined by grout 113 or reducer 117 The water in casing 105 overflows through a tee 125 into a outlet pipe 129. Typically, the center line of outlet pipe 129 is coincident with the elevation 127 of the top of the sand within the wetland (not shown). Effluent from outlet pipe 129 typically flows to either another wetland cell or a disposal system (not shown).

The diameter of wetlands drainage pipe 115 and overflow pipe 123 is varied as desired or limited by ordinance. Typically, wetland drainage pipe 115 and overflow pipe 123 have the same diameters and the diameter ranges from about two inches to about six inches with a typical value of about four inches. The diameter of wetland drainage pipe 115 and overflow pipe 123 should be at least two inches less than the diameter of casing 105. Again, any similar material of construction may be used for wetland drainage pipe 115 and overflow pipe 123 and coupling 119 but preferably, the material is PVC.

EXAMPLES

Several wetlands according to the present invention have been installed and are being operated within the State of Wisconsin. The level control devices are constructed out of PVC piping wherein the casing is 12" schedule 40 PVC pipe and the wetlands drainage pipe and overflow pipes are 4" schedule 40 PVC pipe. In the first installation, the State of Wisconsin required that a source of electrical power be available at the level control device in order to be able to install a heating device should the level control device freeze. This level control device surprisingly functioned throughout a Wisconsin winter without freezing and without requiring any external heat sources. Based on the successful operation of the first level control device, the State of Wisconsin allowed the second level control device to be installed without an electrical power source. The first installation is operating in a peak capacity of 5,900 gallons per day distributed through 4 cells each with a separate level control structure while the second installation operates at a peak capacity of 450 gallons per day. Both installations have been able to function throughout Wisconsin winters without freezing and without requiring external heat.

In comparison, a wetlands was constructed with accordance with the prior art as shown in FIG. 1. Water within the flexible holes would freeze during the Wisconsin winters without external heat supplied by an electric heater installed within the casing.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A device for controlling the level of a constructed wetland wastewater treatment system, the device comprising:
   A) an outer casing with an open top, the outer casing having an inner diameter at least about 4 inches and less than about 18 inches;
   B) an overflow weir in fluid communication with the constructed wetlands wherein the overflow weir is located within the outer casing;
   C) a cap removably attached in a closing position over the open top of the outer casing; and
   D) an outlet in fluid communication with the overflow weir wherein the outlet provides a fluid flow path from the outer casing.

2. The device of claim 1, further comprising insulation around the outer surface of the outer casing and within the cap.

3. The device of claim 1, wherein the device is embedded in a berm proximate to the constructed wetland.

4. The device of claim 1 wherein the cap, when attached in a closing position over the top of the outer casing, forms a windproof seal.

5. The device of claim 1 wherein the weir is adjustable in height.

6. The device of claim 1 wherein the outlet is in fluid communication with another constructed wetland or disposal system.

7. An improved device for controlling the level of a constructed wetland wastewater treatment system, the device comprising:
   A) an outer casing with an open top, the outer casing having an outer surface and an inner surface and an inner diameter at least about 4 inches and less than about 18 inches;
   B) an overflow weir comprising an overflow pipe in fluid communication with the constructed wetland, wherein the overflow pipe is located within the outer casing and has an outer diameter at least about 2 inches less than the inner diameter of the outer casing;
   C) a cap removably attached in a closing position over the open top of the outer casing; and
   D) an outlet in fluid communication with the overflow weir wherein the outlet extends through the outer casing from the inner surface to the outer surface providing a fluid flow path through the outer casing.

8. The device of claim 7 wherein the weir is adjustable in height.

9. The device of claim 8 wherein the weir is adjusted in height by changing the length of the overflow pipe.

10. The device of claim 7 wherein the overflow pipe has an outer diameter between about 2 inches and about 6 inches.

11. The device of claim 7 wherein the overflow pipe is in fluid communication with the constructed wetland through at least one drainage pipe extending from the constructed wetland into the outer casing.

12. The device of claim 11 wherein the overflow pipe is removably attached to the at least one drainage pipe.

* * * * *